(12) United States Patent
Weng

(10) Patent No.: US 8,300,392 B2
(45) Date of Patent: Oct. 30, 2012

(54) ELECTRONIC DEVICE HAVING A MOVABLE DISPLAY SCREEN AND KEYBOARD

(75) Inventor: Cheng-Ying Weng, Taipei (TW)

(73) Assignee: Wistron Corporation, Taipei Hsien (TW)

(*) Notice: Subject to any disclaimer, the term of this patent is extended or adjusted under 35 U.S.C. 154(b) by 256 days.

(21) Appl. No.: 12/907,766

(22) Filed: Oct. 19, 2010

(65) Prior Publication Data

US 2011/0194237 A1  Aug. 11, 2011

(30) Foreign Application Priority Data

Feb. 11, 2010  (TW) ............................... 99203011 U

(51) Int. Cl.
*G06F 1/16*  (2006.01)
(52) U.S. Cl. ................ 361/679.08; 248/201; 360/264.7; 439/271; 165/104.26
(58) Field of Classification Search ............. 165/104.26, 165/80.3; 361/679.33, 679.34, 679.06, 679.46, 361/679.37, 679.36, 679.39, 679.02, 690, 361/747, 728; 248/672, 316.7, 310, 636, 248/27.3, 634, 615, 201, 220.31, 221.11; 360/97.19, 75, 256.2, 244.8, 923, 78.04, 360/99.23, 133, 264.7, 99.08; 345/156, 588, 345/172, 76, 173, 204; 439/540.1, 752, 653, 439/135, 381, 271; 312/223.3, 332.1, 244, 312/270.3, 45, 333, 265.5; 211/26

See application file for complete search history.

(56) References Cited

U.S. PATENT DOCUMENTS

| 6,249,427 B1 * | 6/2001 | Carroll ..................... 361/679.03 |
| 2005/0035262 A1 * | 2/2005 | Seki et al. .................. 248/441.1 |

\* cited by examiner

*Primary Examiner* — Hung Duong
(74) *Attorney, Agent, or Firm* — Steptoe & Johnson LLP

(57) ABSTRACT

An electronic device includes a mainframe having a receiving space, two curved slide grooves, and an elongated slide groove. A display screen is slidable along the curved slide grooves between a stored position and a use position. A keyboard includes a side plate connected slidably to the elongated slide groove, and is movable relative to the mainframe between stored and use positions. The spring member biases a movable arm to press against the side plate. The keyboard is pushed by the movable arm to move automatically toward the use or stored position when the keyboard moves a distance relative to the mainframe.

16 Claims, 15 Drawing Sheets

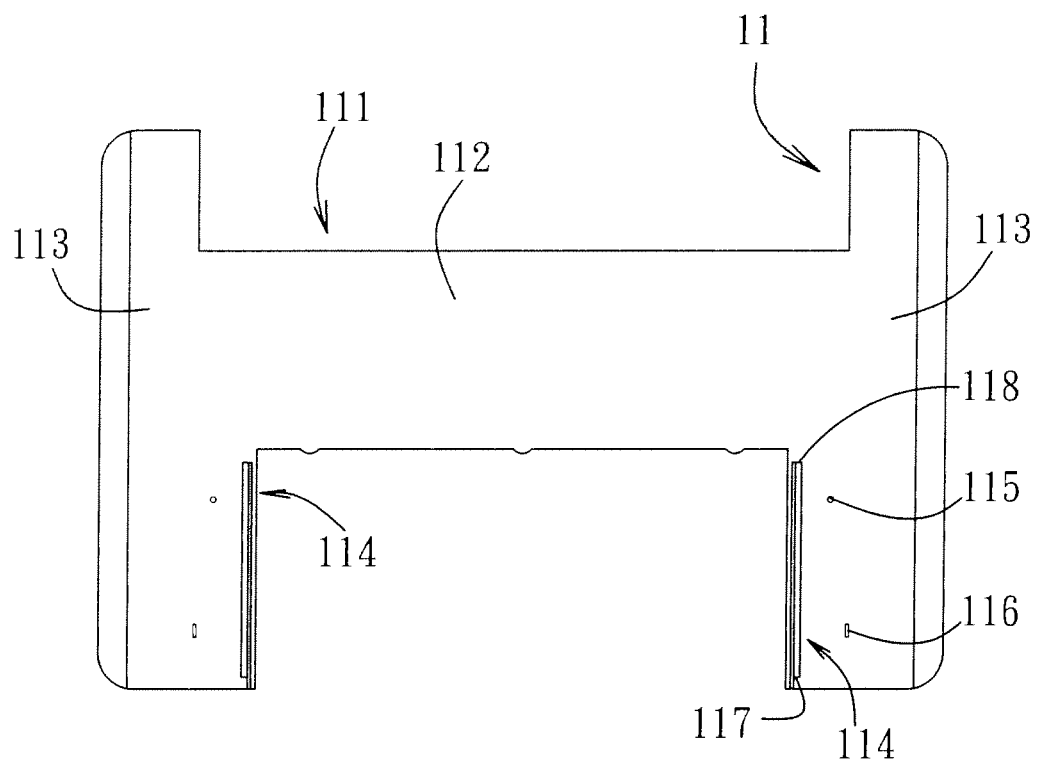
F I G. 3
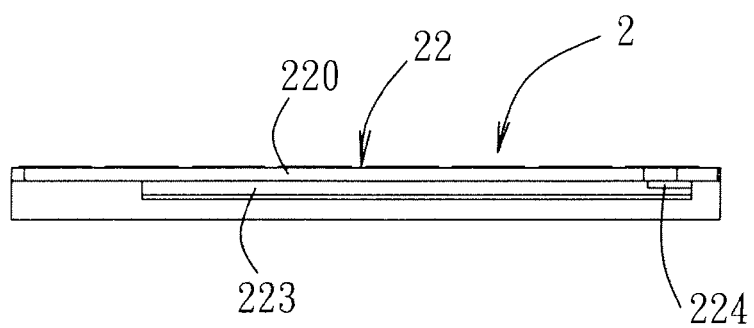
F I G. 4

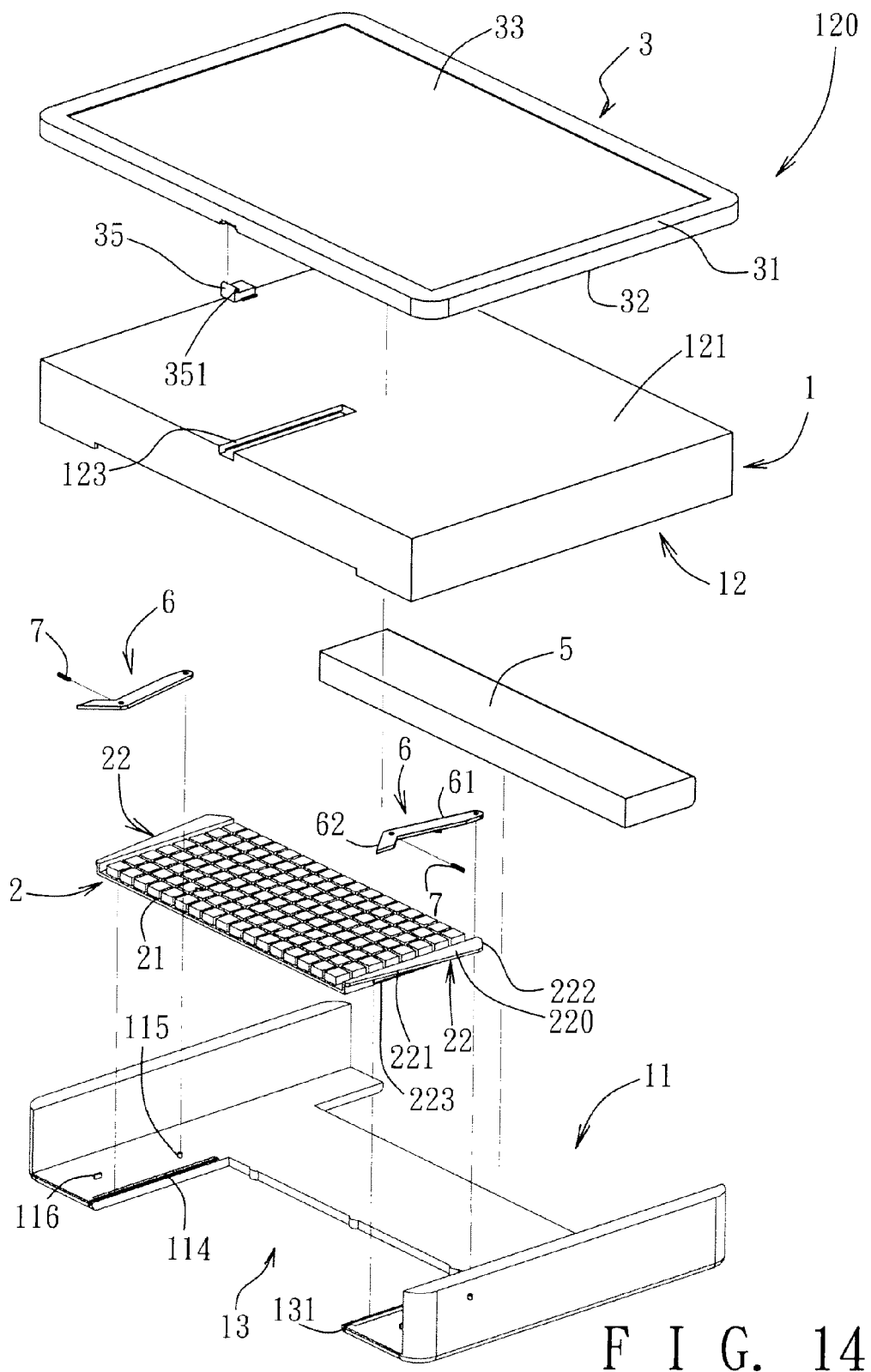
F I G. 14

ELECTRONIC DEVICE HAVING A MOVABLE DISPLAY SCREEN AND KEYBOARD

CROSS-REFERENCE TO RELATED APPLICATION

This application claims priority of Taiwanese Application No. 099203011, filed on Feb. 11, 2010.

BACKGROUND OF THE INVENTION

1. Field of the Invention

This invention relates to an electronic device, more particularly to an electronic device having a movable display screen and keyboard, in which the display screen thereof is rotatable relative to a mainframe between a stored position and a use position through a slide groove structure, and the keyboard thereof is slidable relative to the mainframe between a stored position and a use position through a slide groove structure.

2. Description of the Related Art

An electronic device, as disclosed in Taiwanese Patent No. M357833, has a display screen connected pivotally to a mainframe through a bi-directional shaft, so that the display screen can rotate to two different directions relative to the mainframe. However, the bi-directional shaft has a complicated structural design, and is expensive, so that it will increase the production cost of the electronic device. Further, when the display screen covers the mainframe and a touch screen located on a first face thereof faces upwardly, the electronic device is in a tablet computer use mode, where the user can only use the touch screen, but not the keyboard. When the display screen covers the mainframe and a second face thereof faces upwardly, the user must lift the display screen so as to place the electronic device in a notebook computer use mode. To shift the electronic device back to the tablet computer use mode, the display screen is first rotated so that the touch screen faces rearwardly, after which the display screen covers the mainframe. Hence, use and operation of the aforesaid electronic device are very inconvenient.

Therefore, the area of improvement that the present invention focuses on is that related to realizing a structural design which can minimize production costs and which is easy to use and operate.

SUMMARY OF THE INVENTION

A main object of the present invention is to provide an electronic device which has a movable display screen and keyboard. The display screen has a touch screen that faces outwardly. The display screen and the keyboard are movable relative to a mainframe between a stored position and a use position, so that a user may simultaneously operate the touch screen and the keyboard.

Another object of the present invention is to provide an electronic device which has a movable display screen and keyboard. The display screen has a touch screen that faces outwardly, and is rotatable relative to a mainframe between a stored position and a use position.

Still another object of the present invention is to provide an electronic device which has a movable display screen and keyboard. The display screen has a touch screen that faces outwardly, and the keyboard is slidable relative to a mainframe between a stored position and a use position, so that a user may simultaneously operate the touch screen and the keyboard.

A further object of the present invention is to provide an electronic device which has a movable display screen and keyboard, which can minimize production costs, and which can enhance use and operation thereof.

The purpose of the present invention and the solution to the conventional technical problems are achieved through employment of the below technical means. According to one aspect of disclosure of the present invention, an electronic device having a movable display screen and keyboard comprises a mainframe, a display screen, a keyboard, a movable arm, and a spring member.

The mainframe has left and right lateral sides, and includes a top face, a receiving space that has an opening formed in a bottom end of the mainframe, two curved slide grooves provided respectively on the left and right lateral sides of the mainframe, and an elongated slide groove formed in the bottom end of the mainframe and extending in a front-rear direction. The display screen is disposed on the top face of the mainframe, and includes a front face, a rear face, and a touch screen provided on the front face. The display screen is slidable along the curved slide grooves between a stored position and a use position. The keyboard includes a side plate connected slidably to the elongated slide groove. The keyboard is movable relative to the mainframe between a stored position. The movable arm is connected pivotally to the mainframe to push the side plate. The spring member biases the movable arm to move toward and press against the side plate. The keyboard is pushed by the movable arm to move automatically toward the use position or the stored position when the keyboard moves a distance relative to the mainframe.

The purpose of the present invention and the solution to the conventional technical problems can be further achieved by employment of the below technical means.

According to another aspect of disclosure of the present invention, an electronic device having a movable display screen and keyboard comprises a mainframe, a display screen, a keyboard, a movable arm, and a spring member. The mainframe includes a top face, a receiving space that has an opening formed in a bottom end of the mainframe, and an elongated slide groove formed in the bottom end of the mainframe and extending in a front-rear direction. The display screen is connected pivotally to and disposed on the top face of the mainframe, and includes a front face, a rear face, and a touch screen provided on the front face. The keyboard includes a side plate connected slidably to the elongated slide groove. The keyboard is movable relative to the mainframe between a stored position and a use position. The movable arm is connected pivotally to the mainframe to push the side plate. The spring member biases the movable arm to move toward and press against the side plate. The keyboard is pushed by the movable arm to move automatically toward the use position or the stored position when the keyboard moves a distance relative to the mainframe.

Through the aforesaid technical means, the advantages and effectiveness of the electronic device having a movable display screen and keyboard according to the present invention reside in the fact that as a result of a simple structure of the curved slide groove and connecting element, and the configuration of the elongated guide groove and the slide piece, the manufacturing cost of the electronic device can be minimized. Further, through the touch screen of the display screen that is provided on a front face thereof and that faces outwardly, and the design in which the display panel and the keyboard are respectively rotatable and slidable between the stored position and the use position, use and operation of the present invention can be facilitated and enhanced.

BRIEF DESCRIPTION OF THE DRAWINGS

Other features and advantages of the present invention will become apparent in the following detailed description of the preferred embodiments of the invention, with reference to the accompanying drawings, in which:

FIG. 3 is a schematic top view of a lower casing of the first preferred embodiment;

FIG. 4 is a schematic side view of the keyboard of the first preferred embodiment;

FIG. 14 is an exploded perspective view of an electronic device having a movable display screen and keyboard according to the third preferred embodiment of the present invention;

DETAILED DESCRIPTION OF THE PREFERRED EMBODIMENTS

Figure 1:
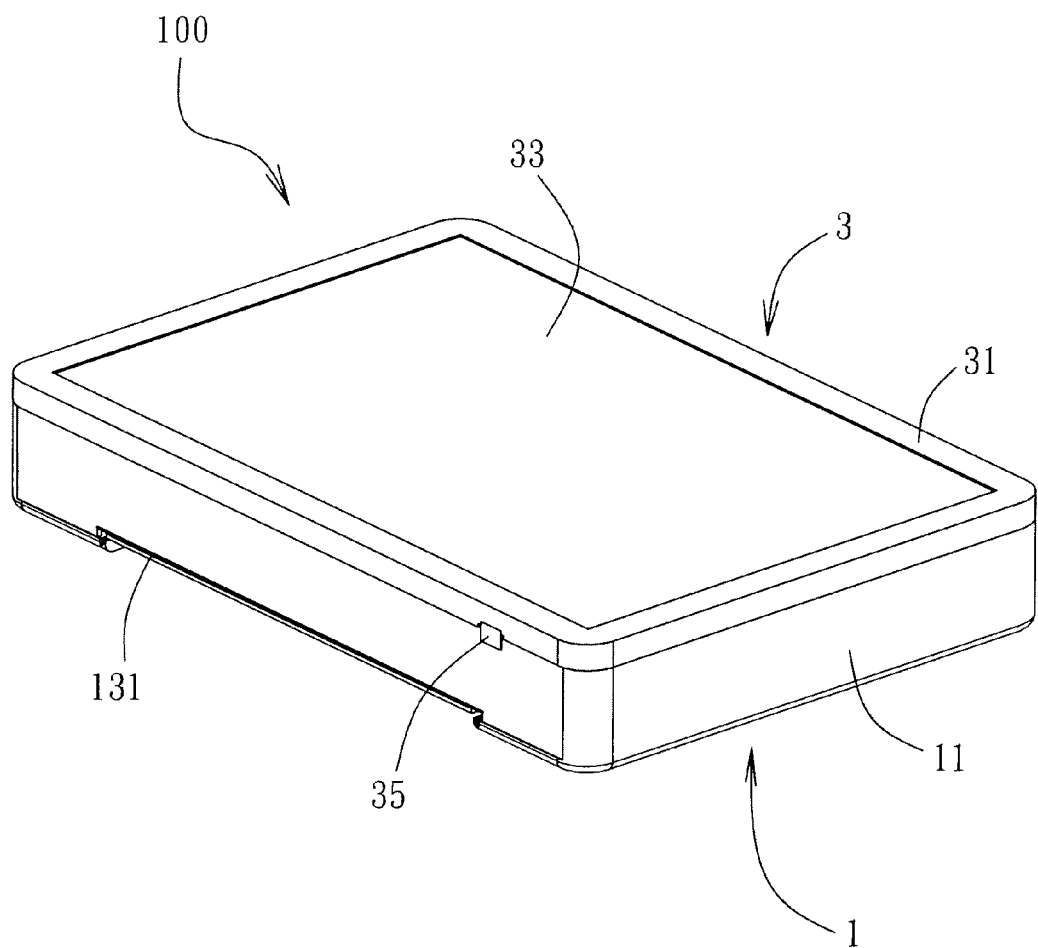
FIG. 1 is a perspective view of an electronic device having a movable display screen and keyboard according to the first preferred embodiment of the present invention.

The above-mentioned and other technical contents, features, and effects of this invention will be clearly presented from the following detailed description of four preferred embodiments in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Before this invention is described in detail, it should be noted that, in the following description, similar elements are designated by the same reference numerals.

Referring to FIGS. 1 to 11, an electronic device 100 having a movable display screen and keyboard according to the first preferred embodiment of the present invention comprises a mainframe 1, a keyboard 2, and a display screen 3. The electronic device 100 is exemplified as a tablet computer in this embodiment.

The mainframe 1 includes a lower casing 11 and an upper casing 12. The upper casing 12 can be assembled fixedly to the lower casing 11 through a screw-fastening or hook-engaging configuration. The upper and lower casings 12, 11 cooperatively define a receiving space 13 to receive therein the keyboard 2. The receiving space 13 has an opening 131 formed in a bottom end of the mainframe 1 and facing frontwardly. A battery 5 of the electronic device 100 is disposed on a rear end of the lower casing 11 for supplying power to the keyboard 2, the display screen 3, and the other electronic components (not shown) during use of the same.

Figure 2:
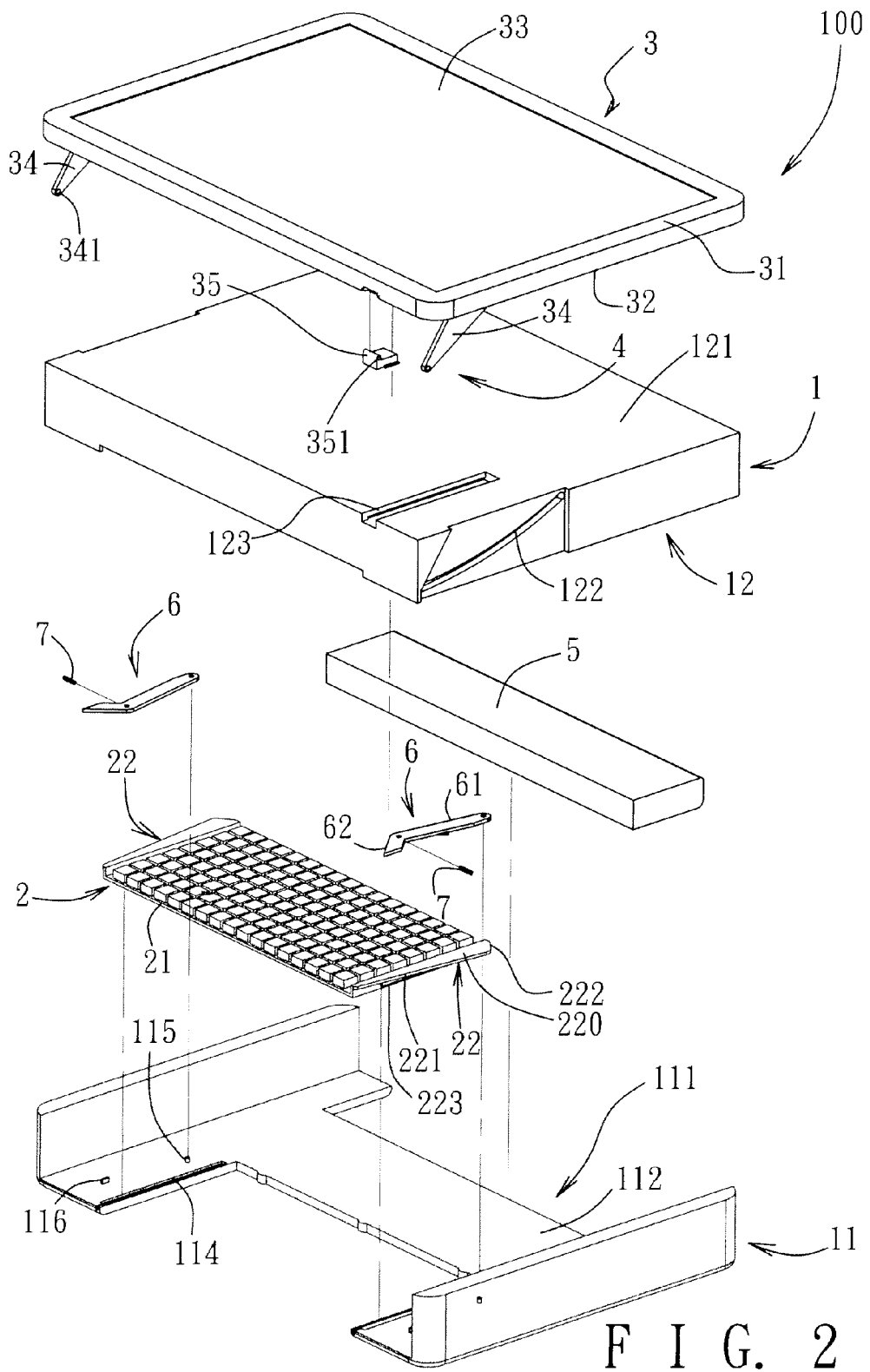
FIG. 2 is an exploded perspective view of the electronic device of the first preferred embodiment.

With reference to FIGS. 2, 3, and 4, the lower casing 11 has a bottom wall 111. The bottom wall 111 includes a main wall body 112, two sidewall portions 113 disposed respectively on left and right sides of the main wall body 112, and two elongated slide grooves 114 formed respectively in the sidewall portions 113 in proximity to a front end of the main wall body 112. Each elongated slide groove 114 extends in a front-rear direction for slidable connection with the keyboard 2. The keyboard 2 includes a keyboard main body 21, and two side plates 22 projecting outwardly and respectively from left and right sides of the keyboard main body 21. Each side plate 22 includes a plate body 220, and an elongated slide-connecting portion 223 projecting from a bottom face of the plate body 220. The slide-connecting portions 223 of the side plates 22 extend in a front-rear direction, and are connected to and slidable along the respective slide grooves 114. Through such a connection, the keyboard 2 is slidable relative to the lower casing 11 of the mainframe 1 between a stored position (see FIG. 5), where the keyboard 2 is disposed in the receiving space 13, and a use position (see FIG. 7), where the keyboard 2 extends out of the receiving space 13 via the opening 131.

Figure 5:
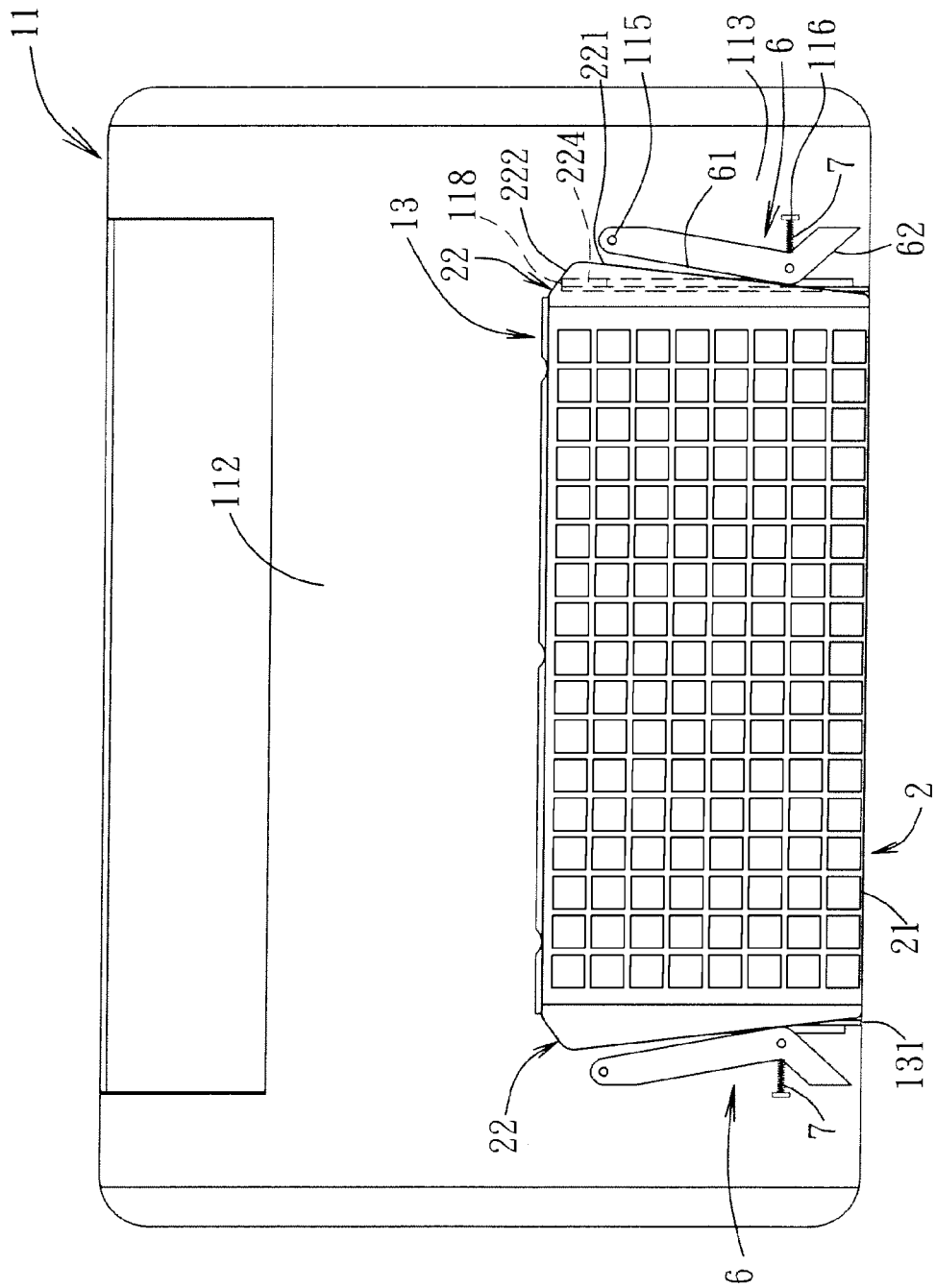
FIG. 5 is a schematic top view of the first preferred embodiment, illustrating the keyboard assembled on the lower casing and in a stored position.

With reference to FIGS. 2 and 5, preferably, in order for a user to pull forwardly the keyboard 2 a definite distance so that the keyboard 2 can slide automatically to the use position or for the user to push rearwardly the keyboard 2 a definite distance so that the keyboard 2 can slide automatically to the stored position, the electronic device 100 further comprises two movable arms 6 and two spring members 7. Each movable arm 6 is substantially L-shaped. Rear ends of the movable arms 6 are connected pivotally and respectively to pivot pins 115 provided on the sidewall portions 113. Each spring member 7 is configured as a compression spring having two opposite ends abutting respectively against a blocking piece 116 provided on one of the sidewall portions 113 and an outer side of a respective movable arm 6. Each spring member 7 biases the respective movable arm 6 to move toward and press against a respective side plate 22. The plate body 220 of each side plate 22 has a first slanting side 221, and a second slanting side 222 connected to a rear end of the first slanting side 221 and cooperating with the first slanting side 221 to form therebetween an included angle. Each movable arm 6 includes a first side arm 61, and a second side arm 62 connected to a front end of the first side arm 61 and cooperating with the first side arm 61 to form therebetween an included angle. When the keyboard 2 is in the stored position, the first side arm 61 of each movable arm 6 abuts against the first slanting side 221 of the respective side plate 22.

Figure 6:
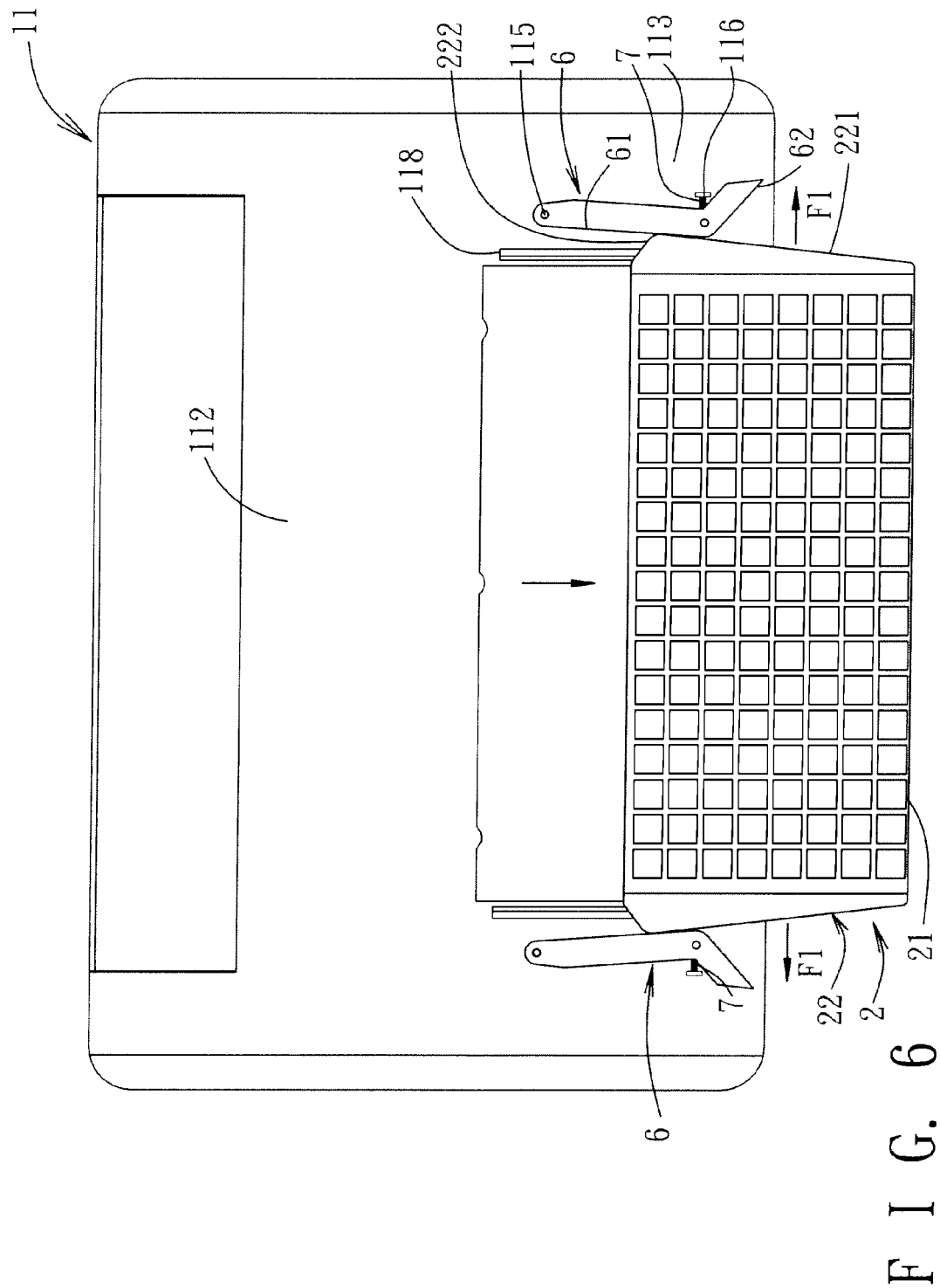
FIG. 6 is a view similar to FIG. 5, but illustrating side plates of the keyboard pushing outwardly and respectively movable arms of the electronic device of the first preferred embodiment.
Figure 7:
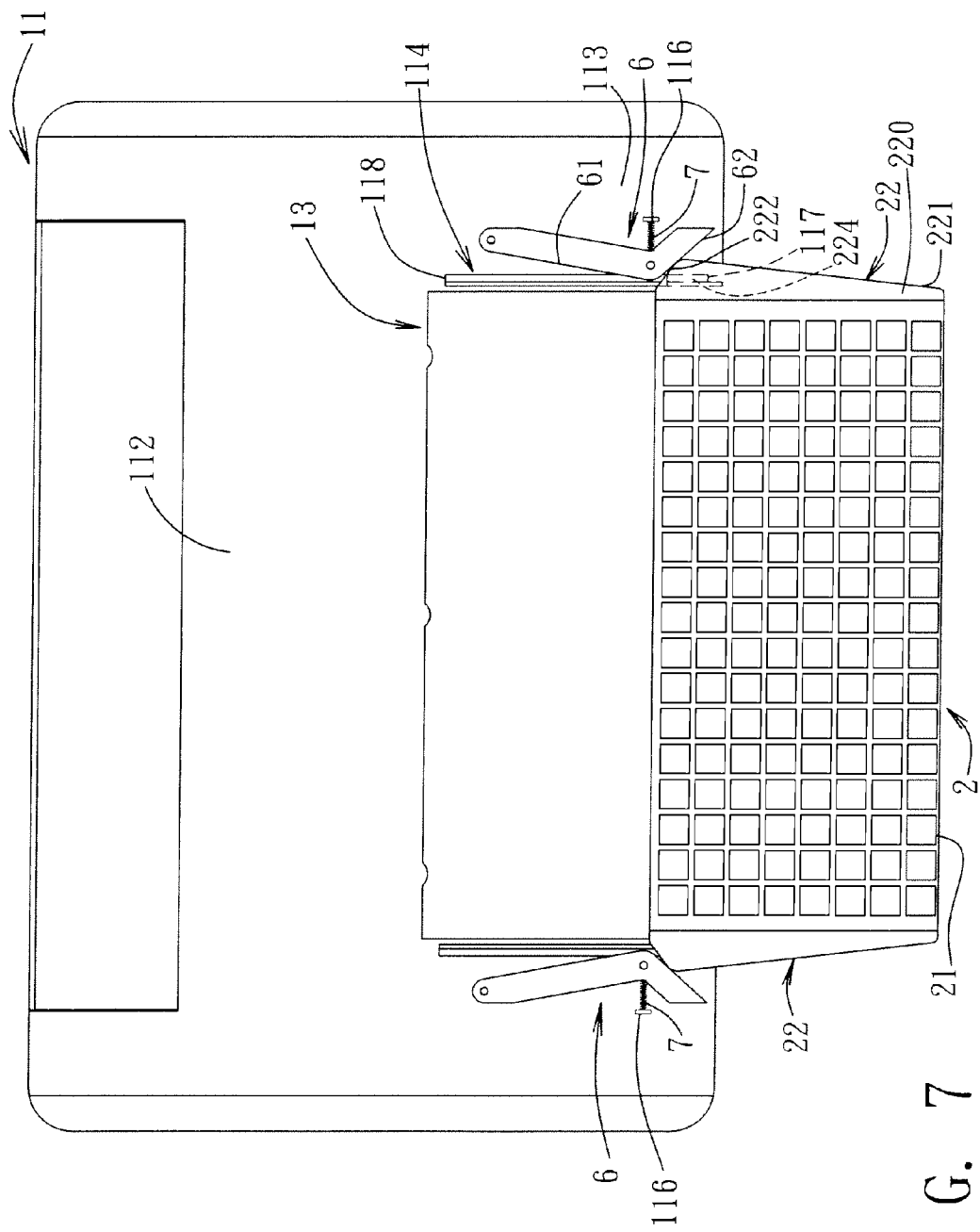
FIG. 7 is a view similar to FIG. 5, but illustrating the keyboard in a use position.

With reference to FIGS. 5, 6, and 7, when a user pulls forwardly the keyboard 2 from the stored position, the first slanting side 221 of each side plate 22 applies an outward pushing force (F1) against the respective movable arm 6, urging each movable arm 6 to pivot about the respective pivot pin 115 and compress the respective spring member 7. As the keyboard 2 is pulled continuously by the user until each first slanting side 221 is separated from the respective first side arm 61, through the restoring forces of the spring members 7 which urge the movable arms 6 to restore to their original positions, the second side arms 62 of the movable arms 6 respectively contact the second slanting sides 222 of the side plates 22, and will respectively apply forward pushing forces against the side plates 22, so that the keyboard 2 can slide automatically forward through the pushing of the movable arms 6. As protrusions 224, which are provided respectively on the bottom faces of the plate bodies 220 of the side plates 22 in proximity to rear ends thereof and adjacent to the slide-connecting portion 223 and which are connected to and slidable along the respective elongated slide grooves 114, abut respectively against front blocking portions 117 at front ends of the elongated slide grooves 114, the keyboard 2 is prevented from moving further in a forward direction. At this time, the second side arms 62 of the movable arms 6 abut respectively against the second slanting sides 222 of the side plates 22, and the keyboard 2 is disposed in the use position, as shown in FIG. 7.

Figure 8:
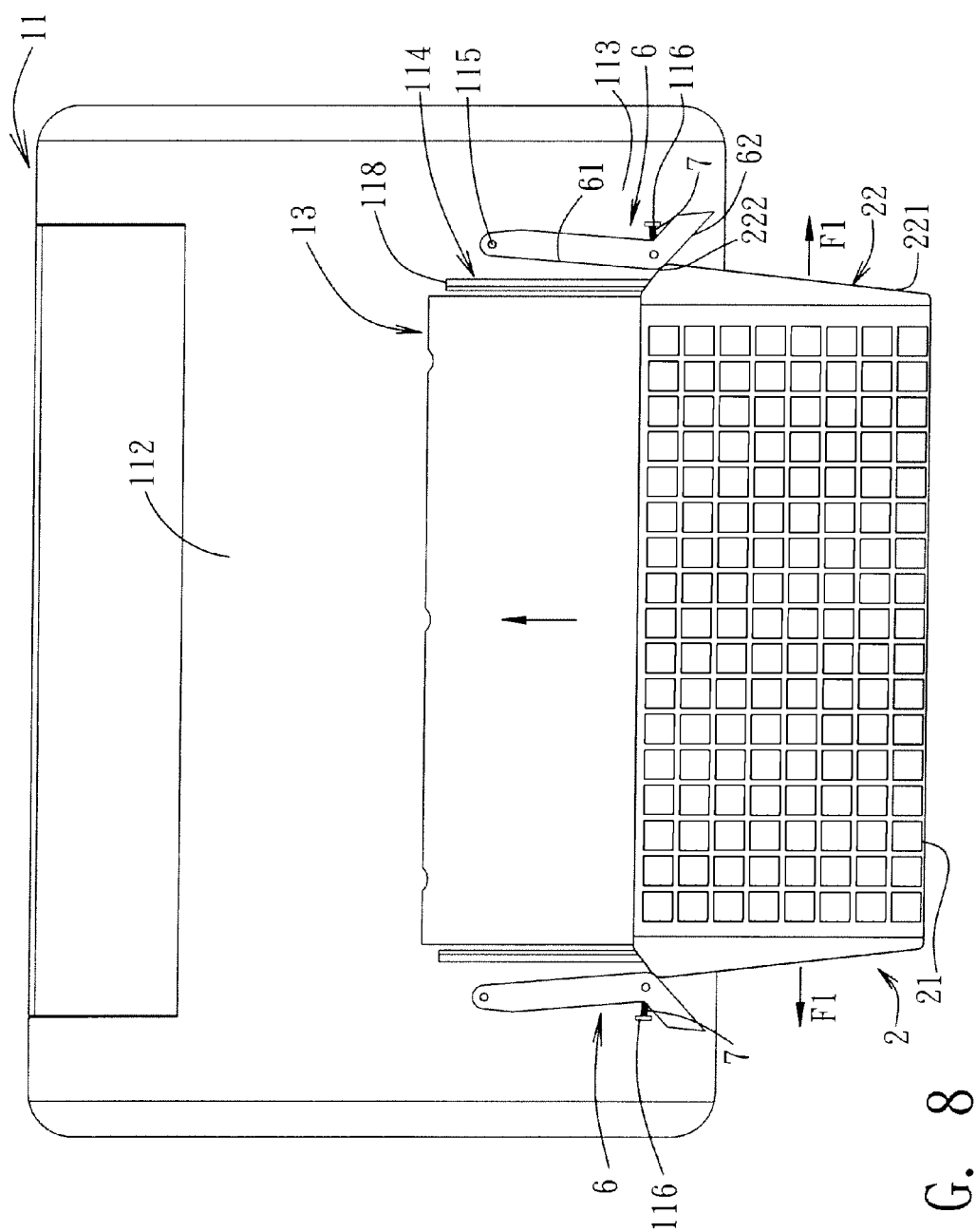
FIG. 8 is a view similar to FIG. 5, but illustrating the side plates of the keyboard pushing outwardly and respectively the movable arms of the electronic device of the first preferred embodiment.

With reference to FIGS. 7 and 8, in combination with FIGS. 5 and 6, in contrast, when the user pushes rearwardly the keyboard 2 from the use position, the second slanting sides 222 of the side plates 22 respectively apply outward pushing forces (F1) against the movable arms 6, urging the movable arms 6 to pivot about the pivot pins 115 and compress the spring members 7, respectively. As the keyboard 2 is pushed continuously by the user until each second slanting side 222 is separated from the respective second side arm 62, through the restoring forces of the spring members 7 which urge the movable arms 6 to restore to their original positions, the first side arms 61 of the movable arms 6 respectively contact the first slanting sides 221 of the side plates 22, and will respectively apply rearward pushing forces against the side plates 22, so that the keyboard 2 can slide rearward automatically through the pushing of the movable arms 6. As the protrusions 224 abut respectively against rear blocking portions 118 at rear ends of the elongated slide grooves 114, and the keyboard main body 21 abuts against a front end of the main wall body 112, the keyboard 2 is prevented from moving further in a rearward direction. At this time, the keyboard 2 is restored automatically to the stored position shown in FIG. 5.

Figure 9:
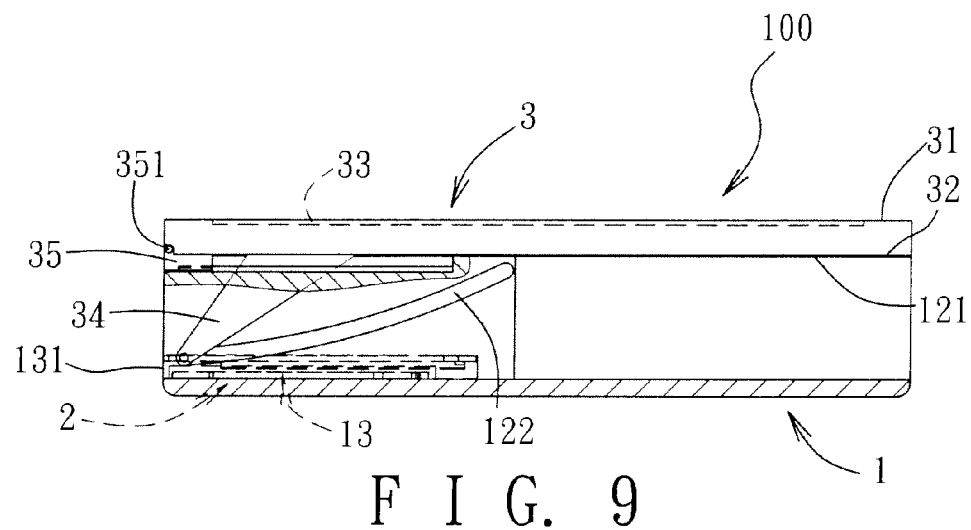
FIG. 9 is a partly sectional side view of the first preferred embodiment, illustrating the keyboard and the display screen respectively in stored positions.
Figure 10:
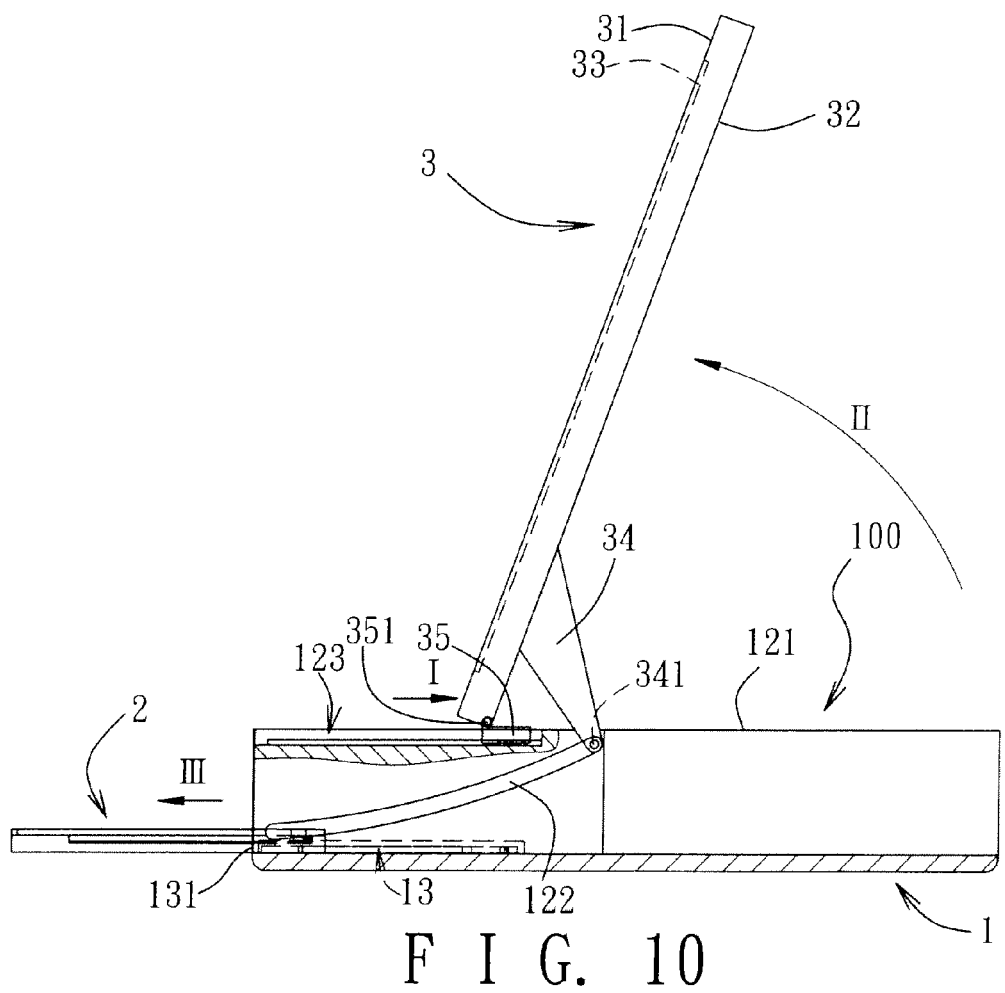
FIG. 10 is a view similar to FIG. 9, but illustrating the keyboard and the display screen respectively in use positions.
Figure 11:
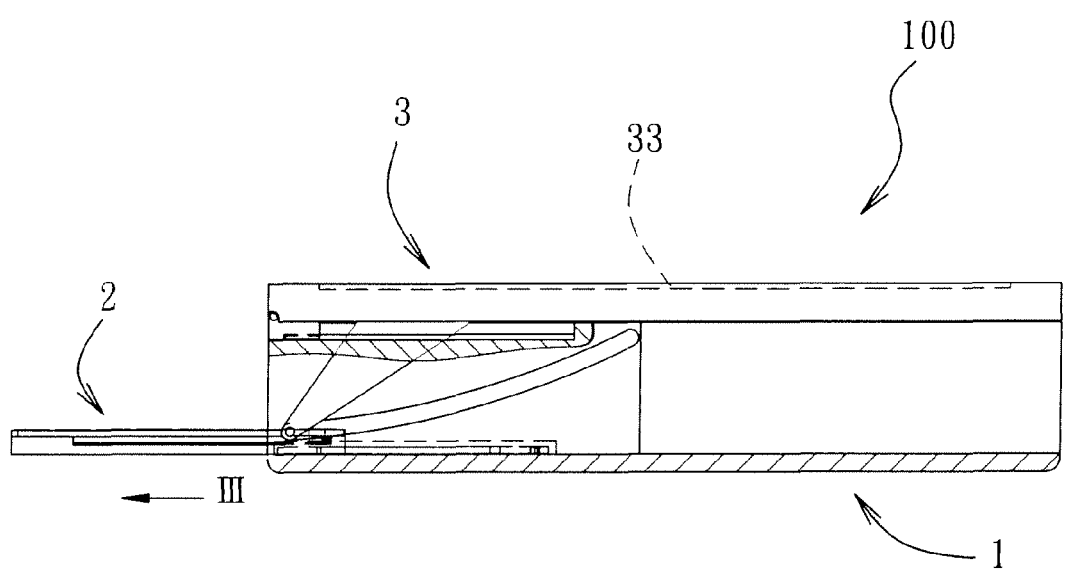
FIG. 11 is a view similar to FIG. 10, but illustrating the display screen in the stored position and the keyboard in the use position.

With reference to FIGS. 2, 9, and 10, the display screen 3 is disposed on the top face 121 of the upper casing 12 of the mainframe 1, and includes a front face 31, a rear face 32, and a touch screen 33 provided on the front face 31. The touch screen 33 allows a user to enter text or number data by using handwriting or a touching method, or to manipulate the electronic device 100. The upper casing 12 of the mainframe 1 is provided with two curved slide grooves 122 (only one is shown in FIGS. 2, 9, and 10) on left and right sides thereof, respectively. The display screen 3 further includes two connecting elements 34 provided on the rear face 32 thereof and connected slidably and respectively to the curved slide grooves 122. Each connecting element 34 has a projection 341 projecting into and slidable along the length of a respective curved slide groove 122. Through such a connection, the display screen 3 is rotatable relative to the mainframe 1 between a stored position (see FIG. 9), where the rear face 32 of the display screen 3 abuts against the top face 121 of the upper casing 12, and a use position (see FIG. 10), where the rear face 32 of the display screen 3 and the top face 121 of the uppercasing 12 form therebetween an included angle.

Preferably, to facilitate rotatable operation of the display screen 3 relative to the mainframe 1, the upper casing 12 of the mainframe 1 is further provided with an elongated guide groove 123 formed in the top face 121 thereof, and the display screen 3 further includes a slide piece 35 connected pivotally to a bottom end of the rear face 32. The elongated guide groove 123 extends in a front-rear direction. The slide piece 35 has a hinge portion 351 on a top end thereof connected pivotally to the bottom end of the rear face 32. The slide piece 35 is connected to and slidable along the length of the elongated guide groove 123. Through such a connection, the user can push the display screen 3 rearwardly along the direction of an arrow (I), and the slide piece 35 can move rearwardly along the elongated guide groove 123. Simultaneously, the display screen 3 will pivot about the slide piece 35 along the direction of an arrow (II), bringing the connecting elements 34 to move rearwardly, slidably, and respectively along the curved slide grooves 122. As the projections 341 of the connecting elements 34 abut respectively against the rear ends of the curved slide grooves 122, the connecting elements 34 are stopped from moving further. At this time, through the presence of the hinge portion 351 of the slide piece 35, and through the corresponding positional relationships among the slide piece 35 and the connecting elements 34, the display screen 3 can be supported in the use position. In use, the user can adjust the display screen 3 to a desired angular position according to an actual requirement, and through the hinge portion 351, the display screen 3 can be positioned at the desired adjusted angular position. It is worth mentioning that, in this embodiment, the hinge portion 351 of the slide piece 35 has a common hinge structure, so that a detailed description of the same is dispensed herewith.

With reference to FIG. 9, when the display screen 3 is in the stored position, the electronic device 100 is in the tablet computer use mode. Since the touch screen 33 faces outwardly, the user can directly manipulate the touch screen 33. Further, with reference to FIG. 11, if the user needs to use the keyboard 2 for input operation, the keyboard 2 can be pulled forwardly from the stored position along the direction of an arrow (III). The keyboard 2, through the pushing of the movable arms 6 (see FIG. 5), will move automatically to the use position. Hence, in the tablet computer use mode, the user can simultaneously use the touch screen 33 and the keyboard 2.

With reference to FIGS. 9 and 10, if the user desires to shift the electronic device 100 from the tablet computer use mode to the notebook computer use mode, the display screen 3 is pushed rearwardly along the direction of the arrow (I) so as to move the same from the stored position to the use position, and the keyboard 2 is pulled forwardly from the stored position to the use position, thereby shifting the electronic device 100 to the notebook computer use mode.

In this embodiment, through the simple structure of the curved slide grooves 122 and the connecting elements 34, and the configuration of the elongated guide groove 123 and the slide piece 35, the display screen 3 is rotatable relative to the mainframe 1. This can result in the reduction of the manufacturing cost of the electronic device 100. Further, since the touch screen 33 is provided on the front face 31 of the display screen 3 and faces outwardly, and since the display screen 3 and the keyboard 2 can respectively rotate and slide between the stored position and the use position, when the electronic device 100 is in the tablet computer use mode, the user can selectively use the touch screen 33 alone or simultaneously use the touch screen 33 and the keyboard 2. Through such a variation, use of the present invention can be facilitated and enhanced. Further, shifting between the use modes of the electronic device 100 can also be facilitated and enhanced.

Figure 12:
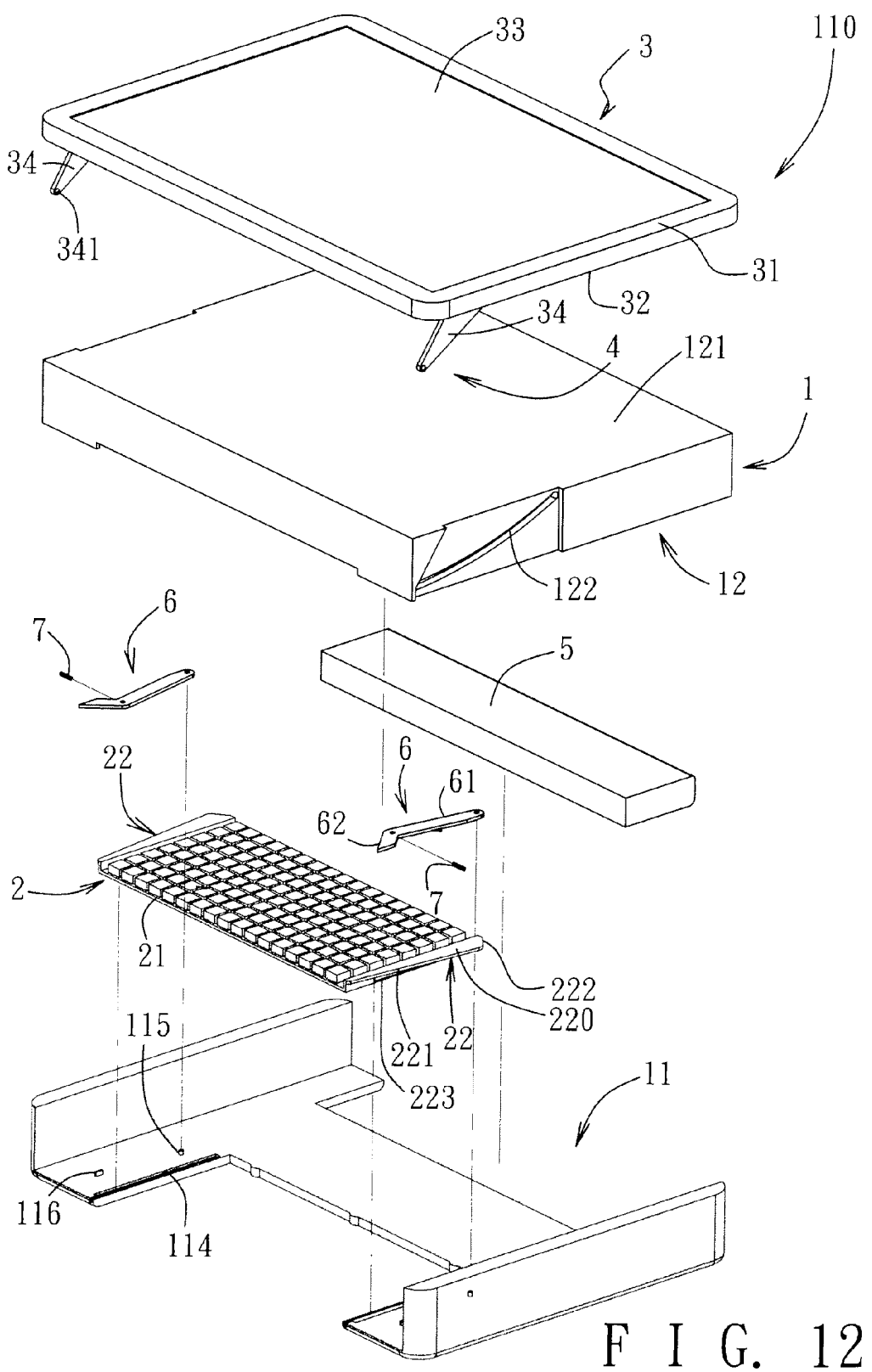
FIG. 12 is an exploded perspective view of an electronic device having a movable display screen and keyboard according to the second preferred embodiment of the present invention.
Figure 13:
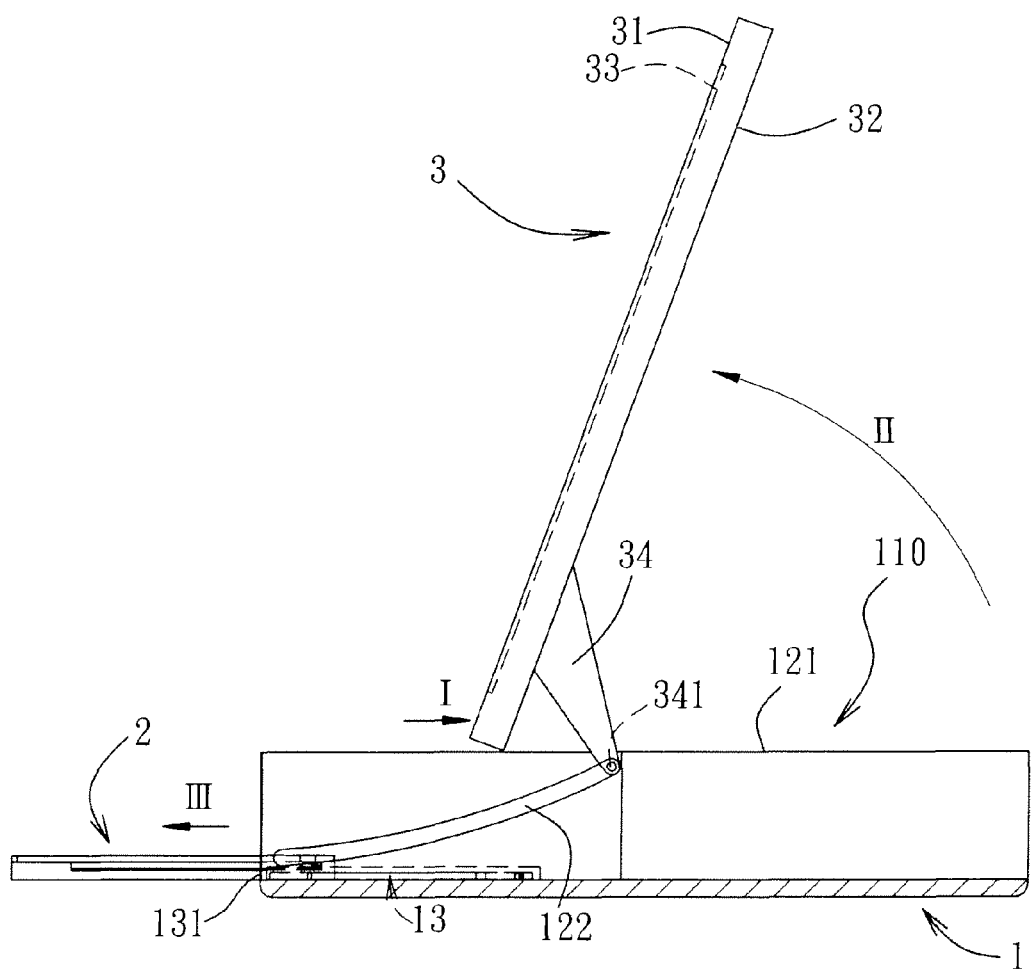
FIG. 13 is a partly sectional side view of the second preferred embodiment, illustrating the keyboard and the display screen respectively in use positions.

FIGS. 12 and 13 illustrate an electronic device 110 having a movable display screen and keyboard according to the second preferred embodiment of the present invention. The whole structure and operating method of the electronic device 110 are similar to those described for the electronic device 100 of the first preferred embodiment. The difference resides in that the mainframe 1 is not formed with the elongated guide groove 123 shown in FIG. 2, and the display screen 3 does not include the slide piece 35 shown in FIG. 2. When the display screen 3 is in the use position, through abutment of the bottom end of the rear face 32 thereof against the top face 121 of the upper casing 12, the display screen 3 can be supported in the use position.

Figure 15:
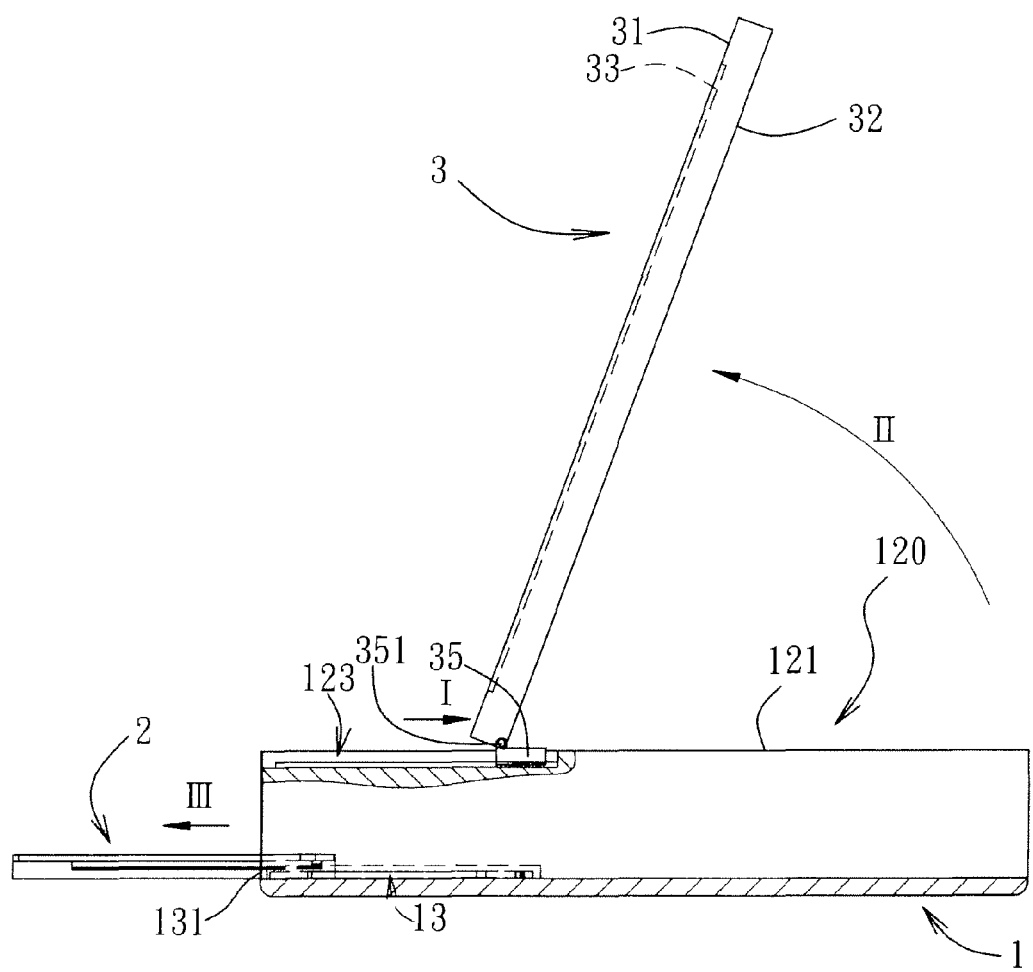
FIG. 15 is a partly sectional side view of the third preferred embodiment, illustrating the keyboard and the display screen respectively in use positions.

FIGS. 14 and 15 illustrate an electronic device 120 having a movable display screen and keyboard according to the third preferred embodiment of the present invention. The whole structure and operating method of the electronic device 120 are similar to those described for the electronic device 100 of the first preferred embodiment. The difference resides in that the mainframe 1 is not formed with the curved slide grooves 122 shown in FIG. 2, and the display screen 3 does not include the connecting elements 34 shown in FIG. 2. Through the configuration of the slide piece 35, the user can first push rearwardly the display screen 3 so as to move the slide piece 35 to the rear end of the elongated guide groove 123, after which the display screen 3 is pivoted to the use position, as shown in FIG. 15. Alternatively, the display screen 3 can first be pivoted to an angular position, after which the slide piece 35 is pushed rearwardly to the rear end of the elongated guide groove 123.

Figure 16:
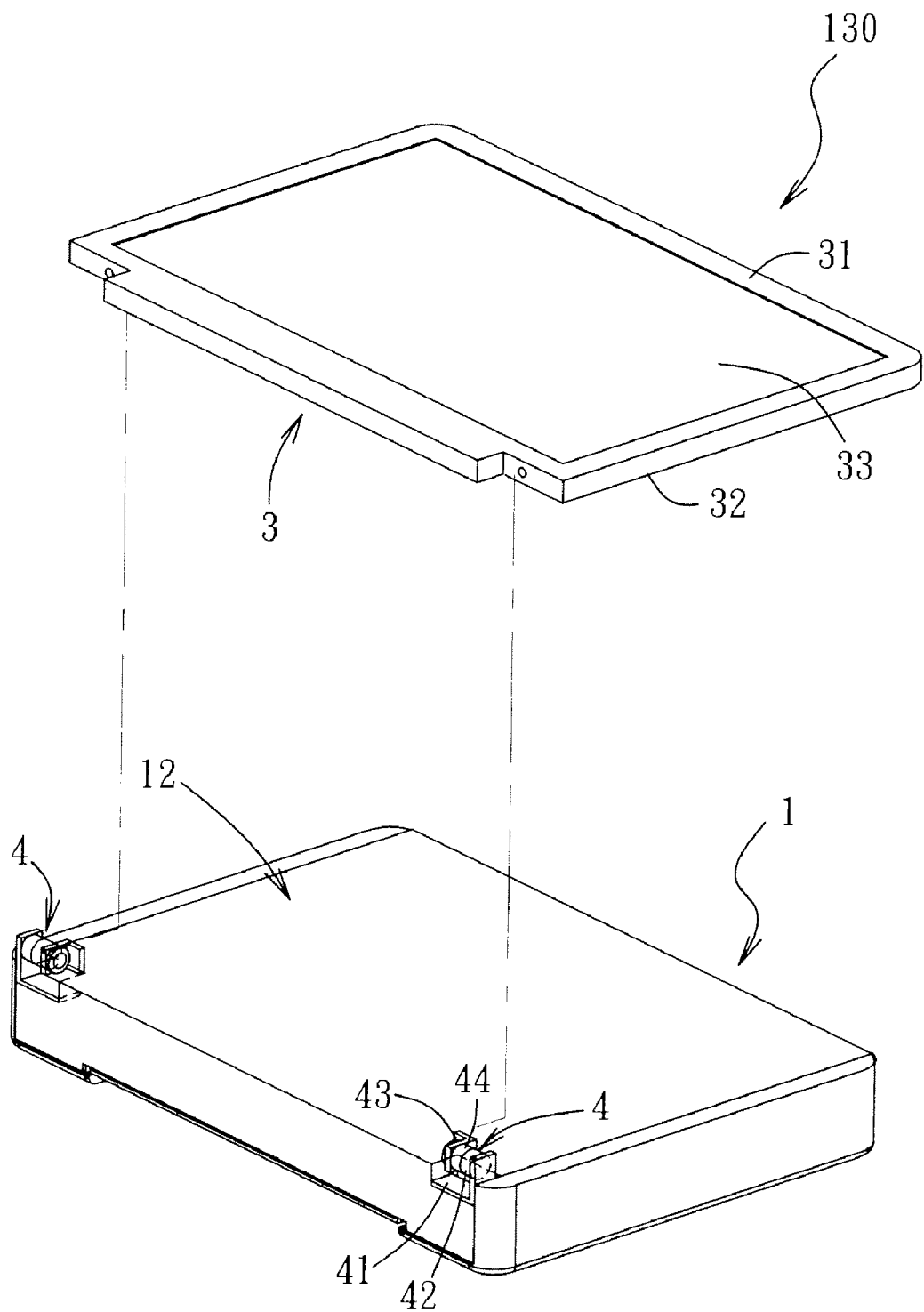
FIG. 16 is an exploded perspective view of an electronic device having a movable display screen and keyboard according to the fourth preferred embodiment of the present invention.
Figure 17:
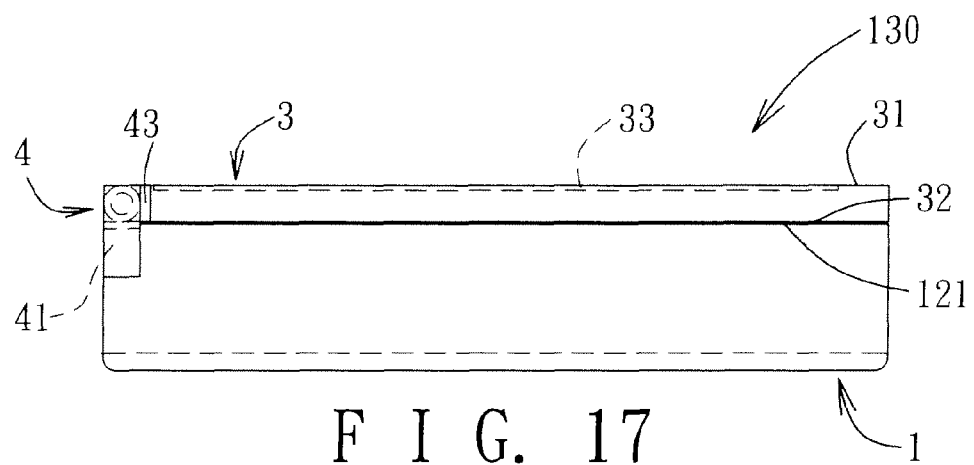
FIG. 17 is a schematic side view of the fourth preferred embodiment, illustrating the display screen in a stored position.
Figure 18:
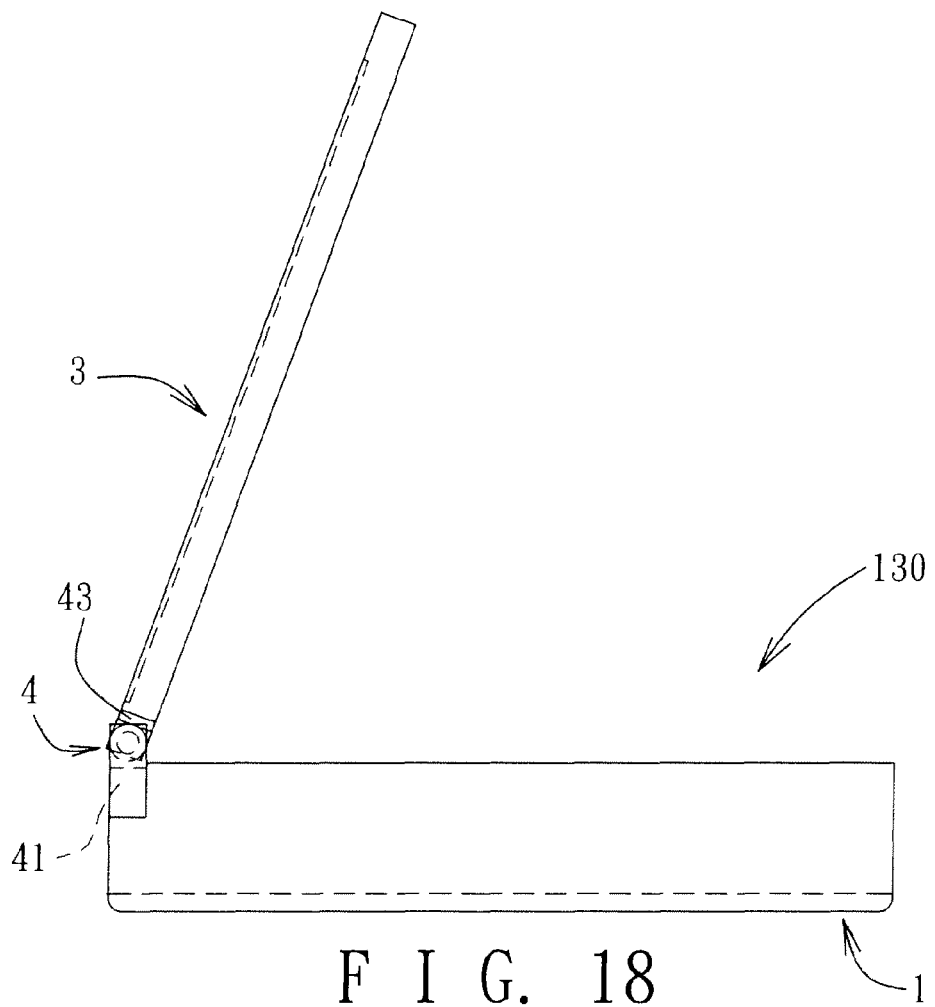
FIG. 18 is a view similar to FIG. 17, but illustrating the display screen in a use position.

FIGS. 16 to 18 illustrate an electronic device 130 having a movable display screen and keyboard according to the fourth preferred embodiment of the present invention. The whole structure and operating method of the electronic device 130 are similar to those described for the electronic device 100 of the first preferred embodiment. The difference resides in the pivot connecting structure of the display screen 3 and the mainframe 1.

In this embodiment, the electronic device 130 further comprises left and right hinge members 4 for interconnecting pivotally and respectively left and right sides of the mainframe 1 and the display screen 3. Each hinge member 41 has a first fixed plate 41 fixed to the upper casing 12, a first pivot-connecting portion 42 provided on the first fixed plate 42, a second fixed plate 43 fixed to the display screen 3, and a second pivot-connecting portion 44 provided on the second fixed plate 43. The second pivot-connecting portion 44 is connected rotatably to the first pivot-connecting portion 42. Through such a connection, the display screen 3 is rotatable relative to the upper casing 12 of the mainframe 1 between the stored position and the use position.

From the aforesaid description, through the simple structure of the curved slide grooves 122 and the connecting elements 34, and the configuration of the elongated guide groove 123 and the slide piece 35, or the configuration of the hinge members 4, the manufacturing cost of the electronic device 100, 110, 120, 130 can be minimized. Further, since the touch screen 33 is provided on the front face 31 of the display screen 3 and faces outwardly, and since the display screen 3 and the keyboard 2 can respectively rotate and slide between the stored position and the use position, use and operation of the present invention can be facilitated and enhanced. Therefore, the objects of the present invention can be realized.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. An electronic device having a movable display screen and keyboard, comprising:
   a mainframe having a left lateral side and a right lateral side and including
      a top face,
      a receiving space that has an opening formed in a bottom end of said mainframe,
      two curved slide grooves provided respectively on said left and right lateral sides of said mainframe, and
      an elongated slide groove formed in said bottom end of said mainframe and extending in a front-rear direction;
   a display screen disposed on said top face of said mainframe and including a front face, a rear face, and a touch screen provided on said front face, said display screen being slidable along said curved slide grooves between a stored position and a use position;
   a keyboard including a side plate connected slidably to said elongated slide groove, said keyboard being movable relative to said mainframe between a stored position and a use position;
   a movable arm connected pivotally to said mainframe to push said side plate; and
   a spring member biasing said movable arm to move toward and press against said side plate, said keyboard being pushed by said movable arm to move automatically toward said use position or said stored position when said keyboard moves a distance relative to said mainframe.

2. The electronic device of claim 1, wherein said rear face of said display screen abuts against said top face of said mainframe when said display screen is in said stored position, and said rear face and said top face form therebetween an included angle when said display screen is in said use position.

3. The electronic device of claim 1, wherein said keyboard is disposed in said receiving space when in said stored position, and extends out of said receiving space via said opening when in said use position.

4. The electronic device of claim 1, wherein said display screen further includes two connecting elements connected to and slidable along said curved slide grooves, respectively.

5. The electronic device of claim 4, wherein said mainframe further includes an elongated guide groove formed in said top face and extending in a front-rear direction, said display screen further including a slide piece connected pivotally to said rear face at a bottom end thereof and connected to and slidable along said elongated guide groove.

6. The electronic device of claim 5, wherein said slide piece includes a hinge portion connected pivotally to said rear face so as to position said display screen at a desired adjusted angular position.

7. The electronic device of claim 1, wherein said side plate includes a first slanting side, and a second slanting side connected to a rear end of said first slanting side and cooperating with said first slanting side to form therebetween an included angle, said movable arm including a first side arm, and a second side arm connected to a front end of said first side arm and cooperating with said first side arm to form therebetween an included angle, wherein, when said first side arm abuts against said first slanting side, said first side arm applies a pushing force against said first slanting side so that said keyboard moves automatically to said stored position, and when said second side arm abuts against said second slanting side, said second side arm applies a pushing force against said second slanting side so that said keyboard moves automatically to said use position.

8. The electronic device of claim 7, wherein said side plate further includes a slide-connecting portion disposed on a bottom side thereof and connected to and slidable along said elongated slide groove.

9. The electronic device of claim 8, wherein said side plate further includes a protrusion disposed on said bottom side adjacent to said slide-connecting portion and connected to and slidable along said elongated slide groove, said mainframe further including a front blocking portion and a rear blocking portion, said protrusion abutting against said front blocking portion to retain said keyboard at said use position, and abutting against said rear blocking portion to retain said keyboard at said stored position.

10. The electronic device of said claim 1, wherein said side plate includes a slide-connecting portion disposed on a bottom side thereof and connected to and slidable along said elongated slide groove.

11. The electronic device of claim 10, wherein said side plate further includes a protrusion disposed on said bottom side adjacent to said slide-connecting portion and connected to and slidable along said elongated slide groove, said mainframe further including a front blocking portion and a rear blocking portion, said protrusion abutting against said front blocking portion to retain said keyboard at said use position, and abutting against said rear blocking portion to retain said keyboard at said stored position.

12. An electronic device having a movable display screen and keyboard, comprising:
  a mainframe including
    a top face,
    a receiving space that has an opening formed in a bottom end of said mainframe, and
    an elongated slide groove formed in said bottom end of said mainframe and extending in a front-rear direction;
  a display screen connected pivotally to and disposed on said top face of said mainframe, said display screen including a front face, a rear face, and a touch screen provided on said front face;
  a keyboard including a side plate connected slidably to said elongated slide groove, said keyboard being movable relative to said mainframe between a stored position and a use position;
  a movable arm connected pivotally to said mainframe to push said side plate; and
  a spring member biasing said movable arm to move toward and press against said side plate, said keyboard being pushed by said movable arm to move automatically toward said use position or said stored position when said keyboard moves a distance relative to said mainframe.

13. The electronic device of claim 12, wherein said keyboard is disposed in said receiving space when in said stored position, and extends out of said receiving space via said opening when in said use position.

14. The electronic device of claim 12, wherein said side plate includes a first slanting side, and a second slanting side connected to a rear end of said first slanting side and cooperating with said first slanting side to form therebetween an included angle, said movable arm including a first side arm, and a second side arm connected to a front end of said first side arm and cooperating with said first side arm to form therebetween an included angle, wherein, when said first side arm abuts against said first slanting side, said first side arm applies a pushing force against said first slanting side so that said keyboard moves automatically to said stored position, and when said second side arm abuts against said second slanting side, said second side arm applies a pushing force against said second slanting side so that said keyboard moves automatically to said use position.

15. The electronic device of claim 14, wherein said side plate further includes a slide-connecting portion disposed on a bottom side thereof and connected to and slidable along said elongated slide groove.

16. The electronic device of claim 15, wherein said side plate further includes a protrusion disposed on said bottom side adjacent to said slide-connecting portion and connected to and slidable along said elongated slide groove, said mainframe further including a front blocking portion and a rear blocking portion, said protrusion abutting against said front blocking portion to retain said keyboard at said use position, and abutting against said rear blocking portion to retain said keyboard at said stored position.

* * * * *